United States Patent Office 3,022,348
Patented Feb. 20, 1962

3,022,348
PREPARATION OF ALKYLAMMONIUM SULFATE SOLUTIONS
Maurice Rubin, Paris, France, assignor to Societe d'Etudes Chimiques pour l'Industrie et l'Agriculture, Paris, France, a French company
No Drawing. Filed Nov. 5, 1957, Ser. No. 694,501
Claims priority, application France Nov. 9, 1956
7 Claims. (Cl. 260—583)

This invention has for its object to provide an improved method of preparing alkylammonium sulfate solutions.

More specific objects are to prepare concentrated alkylammonium sulfate solutions from metal sulfates readily available from natural or industrial sources, including in particular magnesium and calcium sulfates; and to provide such methods of preparation wherein the starting materials used may be of low purity.

It has been discovered in accordance with this invention that when an alkylamine is reacted with a metal sulfate such as calcium or magnesium sulfate, in an aqueous medium, and with or without the presence of carbonic acid gas, the corresponding metal carbonate and/or hydroxide precipitates out of the solution and can be separated by any conventional method from the resulting alkylammonium sulfate solution. In this way 90% or more of the originally present sulfate can be converted to alkylammonium sulfate and the resulting precipitate is readily separable from the solution by filtration or otherwise. The amine and the carbonic acid gas when present react with the metal sulfate without the occurrence of any secondary reactions; in particular, amine-containing double salts are never found to form.

While alkylammonium sulfate solutions of any desired concentration can be prepared by this method, a fundamental advantage of the invention is to permit of producing highly concentrated solutions. More specifically, the invention enables preparation of sufficiently concentrated solutions to be used with exceedingly satisfactory results in the process of manufacturing potassium sulfate by a double decomposition reaction between an alkylammonium sulfate and potassium chloride as disclosed in U.S.A. patent specification No. 594,277 filed June 27, 1956, now Patent No. 2,906.603.

In carrying out the method of the present invention, the reagents may be used in stoichiometric proportions, specifically in a proportion of two amine molecules and one $CO_2$ molecule per sulfate molecule present. However, with remaining operating parameters held constant, an excess of amine increases the reaction rate and increases the quantity of sulfate converted to alkylammonium sulfate. Thus it has been found that about 10% amine in excess over the stoichiometric amount yields particularly favourable results from the standpoint of process economy. Usually, a quantity of carbonic acid gas is employed corresponding to the neutral amine carbonate involved, i.e. 1 molecule $CO_2$ per 2 molecules amine. An excess of carbonic gas in the reaction is not objectionable but neither does it yield any special advantage. Moreover, the reaction is promoted by an increase in temperature. Those sulfates that react most readily, such as gypsum for example, may be successfully converted at ordinary temperature (about 20° C.). With other natural sulfates reacting with somewhat greater difficulty, such as natural kieserite ($MgSO_4.H_2O$), somewhat higher temperatures should be used; thus with natural kieserite yields of about 90% have been obtained at a reaction temperature of about 70° C. and yields higher than 95% at about 100° C. Natural calcium sulfate in the form of gypsum ($CaSO_4.2H_2O$) reacts with particular readiness and gives a yield of 85 to 90% at ordinary temperature, and a yield of 95% at about 40° C.

Natural calcium sulfate in the form of anhydrite ($CaSO_4$) on the other hand reacts less readily, an operating temperature of about 80° C. being required for a 90% yield.

In the practical performance of the method, the amine may first be carbonated and then added to a water solution or suspension of the metal salt, or the solid metal salt may be added to a water solution of amine carbonate. The mixture is agitated and, if necessary, heated, for a suitable period of time as required to effect the conversion, then the precipitate which has formed is separated out of the alkylammonium sulfate solution by any appropriate method. Another way of carrying out the reaction is to pass a current of carbonic acid gas, pure or diluted in an inert gas, through a water solution of amine containing the metal salt dissolved or suspended therein and held in an agitated state.

The particular procedure used will depend to some extent on the desired concentration of the resulting alkylammonium sulfate solution and on the metal sulfate used. Thus magnesium sulfate which is comparatively soluble in water may be used in the form of an aqueous solution even in cases where highly concentrated final alkylammonium sulfate solutions are desired; on the other hand, calcium sulfate, having very low water solubility, should always be reacted in the form of a suspension even where low alkylammonium sulfate concentration is desired in the final solution.

Primary, secondary and tertiary alkylamines may all be used in the method of the invention. Amines are preferably used having a boiling point lower than 100° C. and especially amines wherein the hydrocarbon radical contains from 1 to 4 carbon atoms. The reason is that the alkylammonium sulfate solutions are, of course, prepared with the object of some ultimate use, such as for example, the preparation of potassium sulfate by the method disclosed in the afore-mentioned patent specification. That method which involves a double decomposition reaction between the alkylammonium sulfate and potassium chloride, results in the formation of alkylammonium hydrochloride from whence the amine is recovered for reuse in a subsequent cycle. It is advantageous therefore to select amines that are not too high-boiling in order to facilitate such recovery step. Similar motives will frequently be present in connection with other particular uses to which the alkylammonium sulfate solution prepared according to the invention may ultimately be put.

The salts used as the starting materials herein may comprise natural substances such as ores, or residual compounds from industrial processes. Thus magnesium sulfate may be used in the form of the sulfate heptahydrate $MgSO_4.7H_2O$, or of kieserite $MgSO_4.H_2O$. The use of magnesium salts has one exceedingly advantageous aspect, in that it produces, as a by-product, magnesium carbonate which is a commercially valuable substance. Depending on the operating temperature used, there may be obtained magnesium carbonate trihydrate $MgCO_3.3H_2O$ if the reaction temperature did not exceed about 50° C., or the basic magnesium carbonate at higher reaction temperatures. It has been found furthermore that magnesium sulfate regardless of source will react with an aliphatic amine, even in the absence of added carbonic acid gas, to yield alkylammonium sulfate and magnesia. This modification of the process of the invention, just as the basic procedure described above, makes it possible to dissolve in the form of alkylammonium sulfate at least 90% of the sulfate reacted, by using amounts of amine corresponding to the stoichiometric proportion, or possibly a small excess of amine (e.g. 10%). Depending on the temperature and the reagents used, it is therefore possible to select the particular operating procedure which will allow the magnesium to be recovered in its most desirable form in view of the particular economical conditions present, i.e. either in the form of magnesia, or in the form of basic carbonate or carbonate trihydrate.

The use of calcium sulfates in the method of the invention is of very great advantage because the sulfates used may come from any source and may contain a large amount of impurities. Practically pure alkylammonium sulfate solutions can be prepared from low-content calcium sulfates because the impurities are eliminated along with the precipitating calcium carbonate in the reaction of the invention. Thus, the invention may use calcium sulfate as derived from the commercial manufacture of phosphoric acid by reacting crude phosphates with sulfuric acid, as well as any natural calcium sulfates (gypsum, anhydrite, hemihydrate, and the like).

A few examples will now be given of the manner in which the invention may be practically carried out, it being understood that the examples are illustrative but not limitative of the scope of the invention.

*Example 1*

To 155 parts of a solution containing 52% by weight of neutral isopropylamine carbonate there are added 100 parts magnesium sulfate containing 99% $MgSO_4 \cdot 7H_2O$. The mixture is agitated four hours at about 20° C., and the resulting precipitate is filtered out. After removal of the mother-liquor impregnating the precipitate there are obtained 55 parts solids consisting of magnesium carbonate trihydrate $MgCO_3 \cdot H_2O$ containing 17.1% Mg and 42.5% $CO_3$. The yield of conversion is thus found to be 96% in terms of the magnesium sulfate reacted. The resulting solution contains 76.6 parts isopropylammonium sulfate per 100 waters water.

*Example 2*

100 parts natural kieserite analyzing 98.7%

$$MgSO_4 \cdot H_2O$$

are suspended in 200 parts water. To this suspension there are added 120 parts normal butylamine containing 96.5% by weight of amine and the mixture is agitated four hours while maintaining a temperature of about 70° C. After the resulting precipitate has been filtered out, there is obtained a solution containing 83 parts butylammonium sulfate per 100 parts water. After removal of the water impregnating the precipitate, 47 parts are obtained of a solid containing 82.5% $Mg(OH_2)$ and 14.9% $MgSO_4$, corresponding to a conversion yield of 92% of the magnesium sulfate employed.

*Example 3*

In an autoclave, containing 544 parts of an aqueous solution containing 52% by weight neutral isopropylamine carbonate, 200 parts of natural kieserite are added analyzing 98.7% $MgSO_4 \cdot H_2O$. The mixture is heated to about 100° C. and this temperature is maintained about 4 hours while agitating the mixture. On cooling the mixture is filtered and a solution is obtained containing 121 parts isopropylammonium sulfate per 100 parts water. On removal of the impregnating mother-liquor 143 parts are obtained of a solid having the following composition: 24.3% Mg, 51% $CO_3$ and 2.9% $SO_4$. The solid essentially consists of basic magnesium carbonate and contains a small proportion of unreacted magnesium sulfate. 97% of the sulfate initially provided was converted to soluble isopropylammonium sulfate in the process.

*Example 4*

98 parts natural gypsum analyzing 87.5% $CaSO_4 \cdot 2H_2O$ are suspended in 150 parts water. 113 parts triethylamine analyzing 99% amine by weight are added to the suspension. Through the agitated mixture a current of carbonic acid gas is discharged while cooling so that the temperature does not rise above 30° C. At the end of about 3 hours the solids separate out of the solution and the latter is found to contain 80 parts triethylammonium sulfate per 100 parts water. There are obtained 62.5 parts of a solid free of its impregnating mother liquor and analyzing 6.55% $SO_4$, corresponding to a conversion yield of 91.5% of the gypsum into triethylammonium sulfate.

*Example 5*

78.5 parts of natural anhydrite analyzing 85% $CaSO_4$ are added to 184 parts of an aqueous solution of neutral monomethylamine carbonate containing 37% amine carbonate by weight. The mixture is heated to 80° C. and agitated for about 2 hours. The solution that is separated at the end of the operation contains 44 parts monomethylammonium sulfate per 100 parts water. After removal of the mother liquor there are obtained 58 parts of a solid analyzing 8.6% $SO_4$. This indicates that 89.5% of the calcium sulfate initially introduced were converted to monomethylammonium sulfate.

*Example 6*

78.5 parts of the same natural anhydrite as that used in Example 5 are added to 223 parts of an aqueous solution containing 51% by weight neutral diethylamine carbonate. The mixture is heated to about 80° C. and held at that temperature, and agitated, for about four hours. On cooling a solution is separated containing 100 parts diethylammonium sulfate per 100 parts water. 58 parts of the solid from which the impregnating water has been removed are found to contain 8.3% $SO_4$ corresponding to a conversion yield of 90% of the calcium sulfate used.

What I claim is:

1. Method of producing a solution of an alkylammonium sulfate having the formula:

$$(NHRR'R'')_2SO_4$$

wherein R is an alkyl radical having from 1 to 4 carbon atoms and R' and R'' are selected from the group consisting of hydrogen and alkyl radicals having from 1 to 4 carbon atoms comprising reacting in an aqueous medium a sulfate of a metal selected from the group consisting of magnesium and calcium with an alkylamine having the formula:

$$NRR'R''$$

and in the presence of carbonic acid gas at a temperature from about 20° C. to about 100° C. thereby forming a solution of the said alkylammonium sulfate and a precipitate of the carbonate of said metal and separating the said precipitate from the solution.

2. Method of producing a solution of an alkylammonium sulfate having the formula:

$$(NHRR'R'')_2SO_4$$

wherein R is an alkyl radical having from 1 to 4 carbon atoms and R' and R'' are selected from the group consisting of hydrogen and alkyl radicals having from 1 to 4 carbon atoms comprising reacting in an aqueous medium magnesium sulfate with an alkylamine having the formula:

$$NRR'R''$$

in the presence of carbonic acid gas at a temperature from about 20° C. to 100° C. thereby forming a solution of the said alkylammonium sulfate and a precipitate of magnesium carbonate and separating the said precipitate from the solution.

3. The method claimed in claim 2 wherein the magnesium sulfate is natural kieserite.

4. Method of producing a solution of an alkylammonium sulfate having the formula:

$$(NHRR'R'')_2SO_4$$

wherein R is an alkyl radical having from 1 to 4 carbon atoms and R' and R'' are selected from the group consisting of hydrogen and alkyl radicals having from 1 to 4 carbon atoms comprising reacting in an aqueous medium calcium sulfate with an alkylamine having the formula:

$$NRR'R''$$

in the presence of carbonic acid gas at a temperature from about 20° C. to 100° C. thereby forming a solution of the said alkylammonium sulfate and a precipitate of calcium carbonate and separating the said precipitate from the solution.

5. Method of producing a solution of an alkylammonium sulfate having the formula:

$$(NHRR'R'')_2SO_4$$

wherein R is an alkyl radical having from 1 to 4 carbon atoms and R' and R'' are selected from the group consisting of hydrogen and alkyl radicals having from 1 to 4 carbon atoms comprising reacting in an aqueous medium natural gypsum with an alkylamine having the formula:

$$NRR'R''$$

in the presence of carbonic acid gas at a temperature from about 20° C. to about 40° C. thereby forming a solution of the said alkylammonium sulfate and a precipitate of calcium carbonate and separating the said precipitate from the solution.

6. Method of producing a solution of an alkylammonium sulfate having the formula:

$$(NHRR'R'')_2SO_4$$

wherein R is an alkyl radical having from 1 to 4 carbon atoms and R' and R'' are selected from the group consisting of hydrogen and alkyl radicals having from 1 to 4 carbon atoms comprising reacting in an aqueous medium natural anhydrite with an alkylamine having the formula:

$$NRR'R''$$

in the presence of carbonic acid gas at a temperature from about 40° C. to about 80° C., thereby forming a solution of the said alkylammonium sulfate and a precipitate of calcium carbonate and separating the said precipitate from the solution.

7. The method claimed in claim 1 wherein said alkylamine is reacted in a proportion not substantially greater than about 10% over the stoichiometric proportion with respect to the metal sulfate.

References Cited in the file of this patent

Alth: Annalen Der Chemie und Pharmacie, vol. 91 (1854), page 172.

Divers: J. Chem. Soc., 15, 196–201 (1862).